United States Patent
Jang et al.

(10) Patent No.: US 9,843,979 B2
(45) Date of Patent: Dec. 12, 2017

(54) METHOD AND APPARATUS FOR CELL SELECTION IN A WIRELESS COMMUNICATION SYSTEM

(75) Inventors: Jae Hyuk Jang, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/116,217

(22) PCT Filed: May 10, 2012

(86) PCT No.: PCT/KR2012/003682
§ 371 (c)(1),
(2), (4) Date: Nov. 7, 2013

(87) PCT Pub. No.: WO2012/153995
PCT Pub. Date: Nov. 15, 2012

(65) Prior Publication Data
US 2014/0179320 A1  Jun. 26, 2014

Related U.S. Application Data

(60) Provisional application No. 61/484,645, filed on May 10, 2011.

(30) Foreign Application Priority Data

May 10, 2012 (KR) ........................ 10-2012-0049735

(51) Int. Cl.
*H04W 36/00* (2009.01)
*H04W 36/30* (2009.01)
*H04W 48/20* (2009.01)

(52) U.S. Cl.
CPC ........... *H04W 36/30* (2013.01); *H04W 48/20* (2013.01)

(58) Field of Classification Search
CPC combination set(s) only.
See application file for complete search history.

(56) References Cited

U.S. PATENT DOCUMENTS 6,829,227 B1   12/2004 Pitt et al.
2009/0238098 A1   9/2009 Cai et al.
(Continued)

FOREIGN PATENT DOCUMENTS

EP    2 180 736 A1   4/2010
JP    2008-172373 A   7/2008
(Continued)

OTHER PUBLICATIONS

3GPP TSG RAN WG2 Meeting #74, Idle Mode Mobility Enhancement in a Heterogeneous Network, R2-113023, May 9-13, 2011, Barcelona, Spain.

(Continued)

*Primary Examiner* — Idowu O Osifade
(74) *Attorney, Agent, or Firm* — Jefferson IP Law, LLP

(57) ABSTRACT

The present invention relates to a method for cell selection in a wireless communication system. The method for cell selection by a terminal according to one embodiment of the present invention may comprise the following steps: measuring the channel quality of a first cell; measuring the channel quality of a second cell; determining whether the value obtained by applying an offset to the result of the measurement of the channel quality of the second cell is better than the result of the measurement of the channel quality of the first cell; if the value obtained by applying an offset to the result of the measurement of the channel quality of the second cell is better than the result of the measurement of the channel quality of the first cell, determining whether the value obtained by applying no offset to the result of the measurement of the channel quality of the second cell is better than a preset reference value; and, if the value (Continued)

obtained by applying no offset to the result of the measurement of the channel quality of the second cell is better than the preset reference value, selecting the second cell. According to one embodiment of the present invention, an operable cell can be selected to prevent malfunctions, and interference from a CSG cell may be reduced.

14 Claims, 9 Drawing Sheets

(56) References Cited

U.S. PATENT DOCUMENTS

| | | | |
|---|---|---|---|
| 2009/0238117 | A1 | 9/2009 | Somasundaram et al. |
| 2009/0257353 | A1 | 10/2009 | Song et al. |
| 2010/0029274 | A1* | 2/2010 | Deshpande .......... H04J 11/0093 455/435.3 |
| 2010/0110897 | A1 | 5/2010 | Chun et al. |
| 2010/0144299 | A1 | 6/2010 | Ren |
| 2010/0144317 | A1 | 6/2010 | Jung et al. |
| 2010/0272086 | A1 | 10/2010 | Jung et al. |
| 2011/0086651 | A1 | 4/2011 | Li et al. |
| 2011/0171962 | A1 | 7/2011 | Iwamura et al. |
| 2011/0280223 | A1* | 11/2011 | Maeda ................ H04W 4/08 370/335 |
| 2012/0004010 | A1* | 1/2012 | Tamura ................ H04W 24/10 455/525 |
| 2012/0113843 | A1* | 5/2012 | Watfa ................ H04W 72/1289 370/252 |
| 2012/0115469 | A1* | 5/2012 | Chen ................ H04W 36/0094 455/434 |
| 2014/0031041 | A1* | 1/2014 | Jung et al. .................... 455/437 |

FOREIGN PATENT DOCUMENTS

| | | |
|---|---|---|
| JP | 2010-074739 A | 4/2010 |
| KR | 10-2010-0051005 A | 5/2010 |
| KR | 10-2010-0116531 A | 11/2010 |
| WO | 2011/025217 A2 | 3/2011 |
| WO | 2011/050564 A1 | 5/2011 |

OTHER PUBLICATIONS

3rd Generation Partnership Project; Technical Specification Group Radio Access Network; User Equipment (UE) procedures in idle mode and procedures for cell reselection in connected mode (Release10), 3GPP TS 25.304, v10.0.0, Mar. 28, 2011, pp. 1-51, XP050476462, Sophia-Antipolis, France.
Huawei, Inter frequency Cell Reselection from macro cell to CSG, 3GPP TSG RAN2 Meeting #63, R2-085659, Sep. 23, 2008, Prague, Czech Republic.
NTT DOCOMO: Downlink Interference Coordination Between eNodeB and Home eNodeB,3GPP Draft, 3rd Generationpartnership Project (3GPP),Aug. 2009 (Aug. 18, 2009), 650, Route Desluciole; F-06921 Sophiaantipolis Cedex; France, no. Shenzhen, China; 20090818, XP050354272.
NTT DOCOMO et al: MBSFN subframe and ABS coordination for eICIC,3GPP Draft, vol. RAN WG3, Nov. 2010 (Nov. 9, 2010),3rdGeneration Partnership Project (3GPP), Mobile Competence Centre ; 650, Route Des Lucioles; F-06921 Sophia-Antipolis Cedex ; France, XP050467368.
3GPP, 3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.311, Mar. 2011, V10.1.0, XP050476531.
Huawei et al., Remaining Issues Regarding RLF Reporting for MDT, 3GPP TSG-RAN WG2 Meeting #73, Feb. 21-25, 2011, R2-111239, Taipei.
European Office Action dated Aug. 25, 2017, issued in European Application No. 17180373.7.
Korean Office Action dated Sep. 5, 2017, which issued in Korean Application No. 10-2011-0118895.
3rd Generation Partnership Project; Technical Specification Group Radio Access Network; Evolved Universal Terrestrial Radio Access (E-UTRA); User Equipment (UE) radio access capabilities (Release 10), 3GPP TS 36.306, Dec. 2010, V10.0.0, XP050462122, Sophia Antipolis, France.
European Office Action dated Sep. 20, 2017, issued in the European Application No. 12746824.7
European Office Action dated Oct. 25, 2017, issued in the European Application No. 12 782 615.4-1875

* cited by examiner

METHOD AND APPARATUS FOR CELL SELECTION IN A WIRELESS COMMUNICATION SYSTEM

TECHNICAL FIELD

The present invention relates to a wireless communication system and, in particular, to a cell reselection method and a method for reporting interference of non-Closed Subscriber Group (non-CSG) cells in a Long Term Evolution (LTE) system.

BACKGROUND ART

Recently, the wireless communication technology has developed rapidly along with the advance of communication system technology, and the LTE system is one of the prominent $4^{th}$ Generation mobile communication systems.

The LTE system adopts various advanced functions. For example, the LTE system supports heterogeneous network (hereinafter, referred to as HetNet) capable of accommodating the situation where the macro eNBs having relatively large coverage for dynamic eNB/cell deployment adoptive to various situation and supporting CSG cells for providing service to the restricted users.

In order to support the HetNet structure, the current standard is designed to select a pico cell with priority, even when the signal quality of the pico cell is bad, by ignoring the difference as much as the offset/bias applied to the pico cell in cell reselection. However, although the pico cell is selected with the offset/bias, if the pico cell of which signal is too bad to perform communication is selected, this causes problem. That is, the pico cell which selected with the advantage of the offset/bias value but of which signal strength is too bad to perform communication causes problem.

In the situation where the CSG cell and other cells coexist in the network, if the UE is not a member of the CSG cell, it may detects the signal of the CSG cell which is storing enough but cannot connects the corresponding cell.

FIG. 1 is diagram illustrating a heterogeneous network structure. In FIG. 1, the UE 305 cannot communicate with the CSG cell 303 although it is close to the CSG cell 303 physically. In this case, the UE 305 has to attempt connection to the macro eNB 301 but it is difficult to communicate with the macro eNB 301 due to the strong interference signal from the CSG cell 303.

DISCLOSURE OF INVENTION

Technical Problem

The present invention has been conceived to solve the above problem and aims to provide a method for selecting a best cell in the HetNet scenario and a method for a UE which is not a member of the CSG cell to report interference of the CSG cell in the situation where the CSG and other cells in a wireless mobile communication system.

Solution to Problem

In accordance with an aspect of the present invention, a cell selection method of a terminal includes measuring channel quality of a first cell, measuring channel quality of a second cell, determining whether a value obtained by applying an offset to the channel quality of the second cell is greater than the channel quality of the first cell, determining, when the value obtained by applying an offset to the channel quality of the second cell is greater than the channel quality of the first cell, the channel quality of the second cell without application of the offset is greater than a predetermined threshold, and selecting, when the channel quality of the second cell without application of the offset is greater than a predetermined threshold, the second cell.

In accordance with another aspect of the present invention, a scheduling method of a base station includes receiving a connection setup message or a connection reestablishment message from a terminal, determining whether the connection setup message or the connection reestablishment message includes an indicator notifying of existence of interference from other cell, and scheduling, when the connection setup message or the connection reestablishment message includes an indicator, resource for the terminal in consideration of the interference.

In accordance with another aspect of the present invention, a terminal includes a controller which measures channel qualities of a first and second cells and determines whether a value obtained by applying an offset to the channel quality of the second cell is greater than the channel quality of the first cell. The controller determines, when the value obtained by applying an offset to the channel quality of the second cell is greater than the channel quality of the first cell, the channel quality of the second cell without application of the offset is greater than a predetermined threshold. The controller selects, when the channel quality of the second cell without application of the offset is greater than a predetermined threshold, the second cell.

In accordance with still another aspect of the present invention, a base station includes a transceiver which receives a connection setup message or a connection reestablishment message from a terminal, a controller which determines whether the connection setup message or the connection reestablishment message includes an indicator notifying of existence of interference from other cell, and a scheduler which schedules, when the connection setup message or the connection reestablishment message includes an indicator, resource for the terminal in consideration of the interference.

Advantageous Effects of Invention

The cell selection method and apparatus of the present invention is capable of selecting a communication-available cell in the situation where the offset/bias is applied in the HetNet situation to as to continue communication and controlling interference of the corresponding CSG efficiently by reporting the interference from the non-CSG cell

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail.

Figure 2:
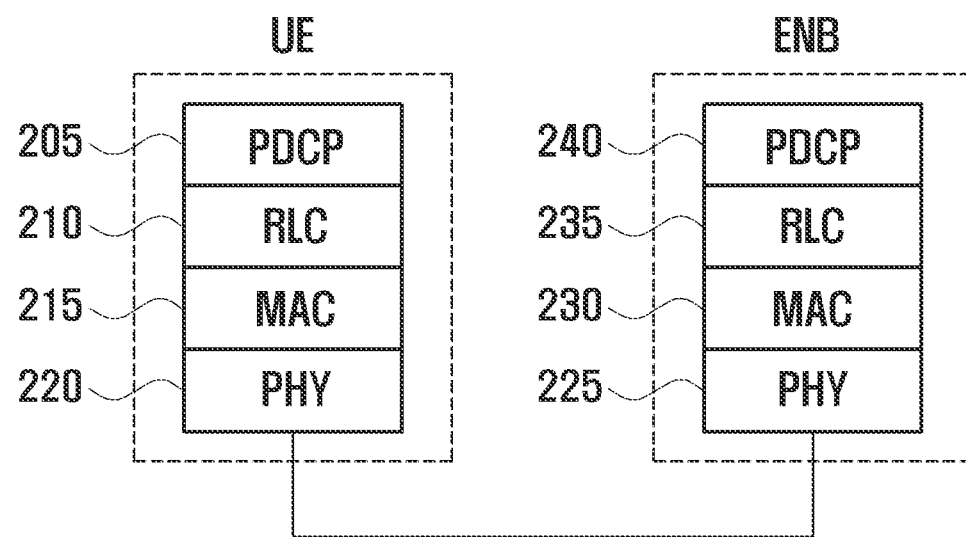
FIG. 2 is a diagram illustrating the architecture of an LTE system to which the present invention is applied.

FIG. 2 is a diagram illustrating the architecture of an LTE system to which the present invention is applied.

Referring to FIG. 2, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 2, the eNBs 105, 110, 115, and 120 corresponds to the legacy node Bs of the UMTS system. The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is the entity responsible for various control functions as well as UE mobility management and connected to a plurality of eNBs.

Figure 3:
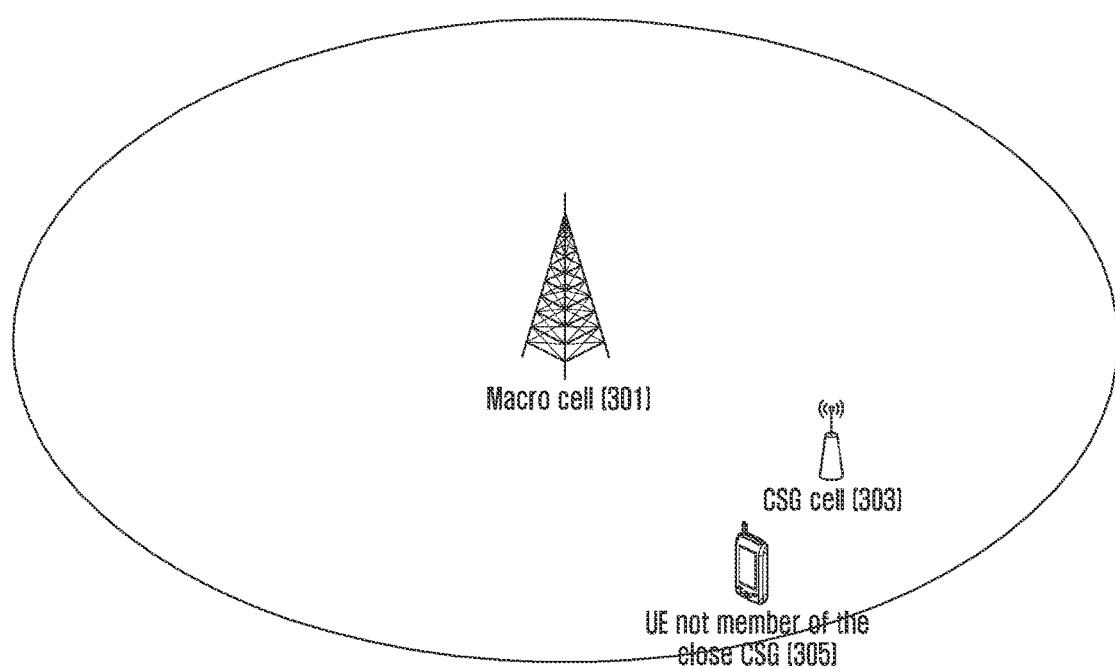
FIG. 3 is a diagram illustrating a protocol stack of the LTE system to which the present invention is applied.

FIG. 3 is a diagram illustrating a protocol stack of the LTE system to which the present invention is applied.

Referring to FIG. 3, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in an appropriate size. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried Physical Uplink Control Channel (PUCCH) or Physical Uplink Shared Channel (PUSCH).

Figure 4:
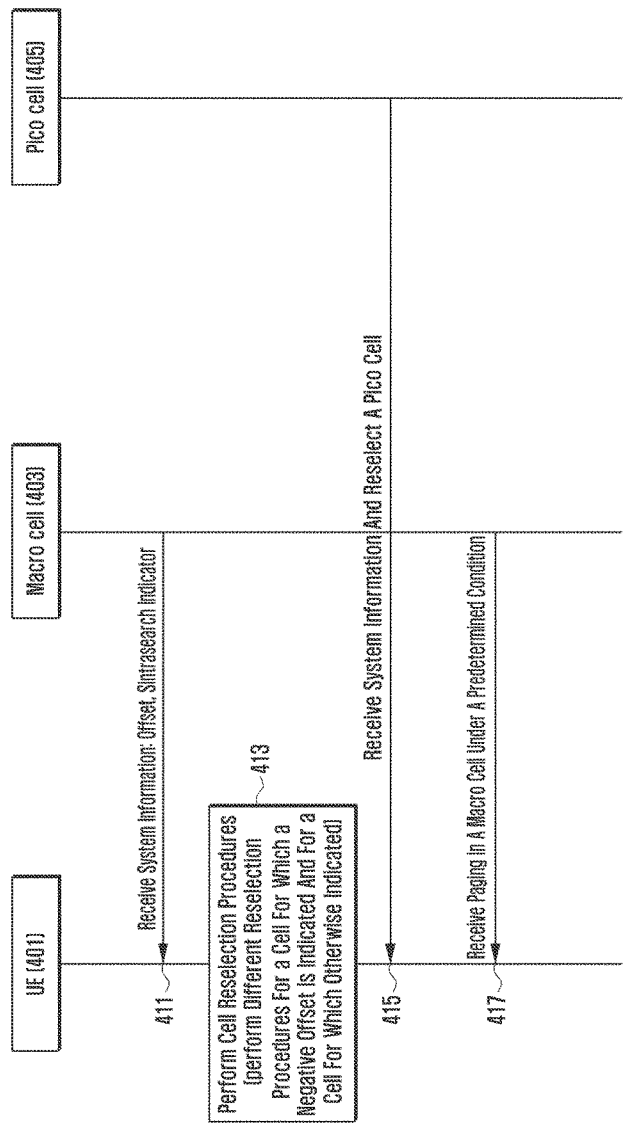
FIG. 4 is a signal flow diagram illustrating a cell reselection procedure according to an embodiment of the present invention.

FIG. 4 is a signal flow diagram illustrating a cell reselection procedure according to an embodiment of the present invention.

Figure 1:
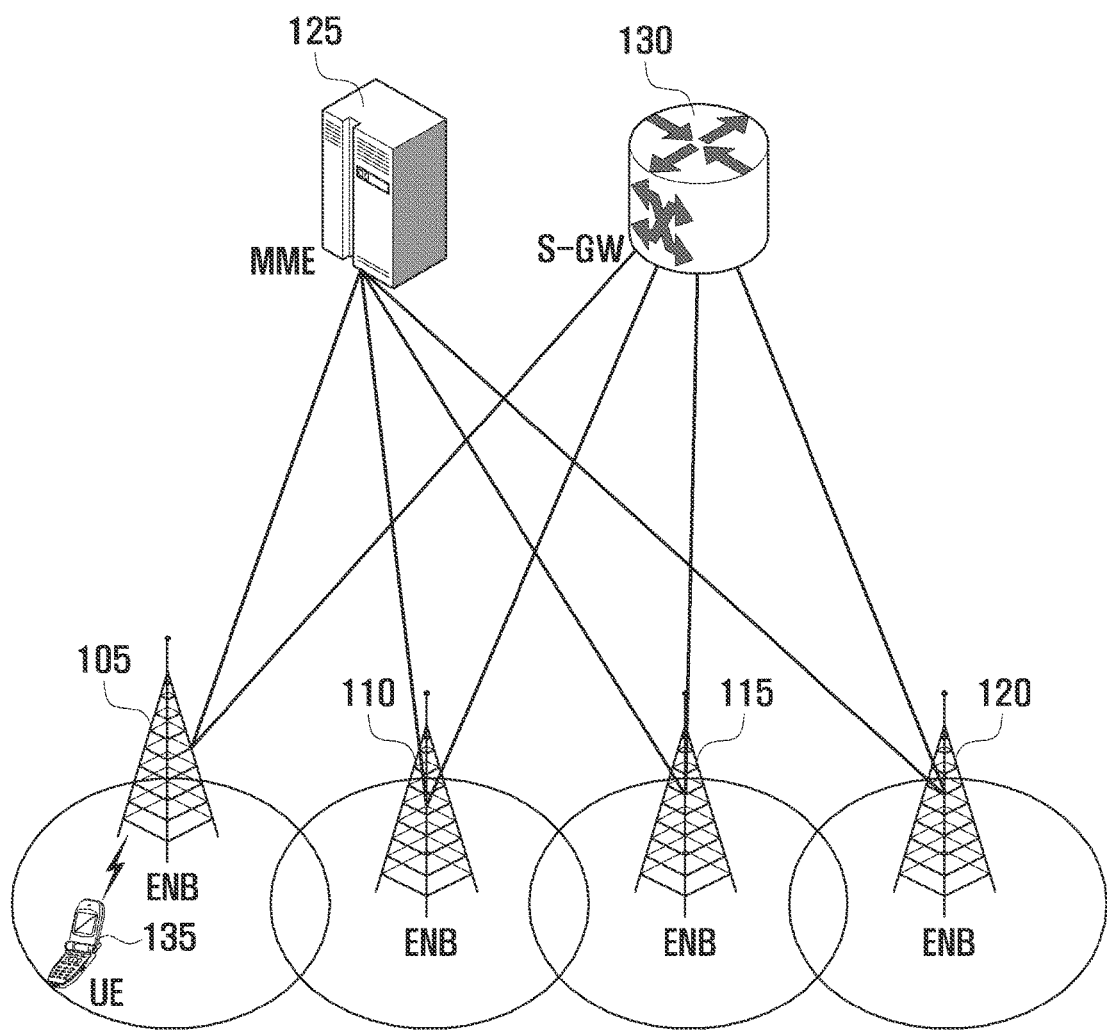
FIG. 1 is diagram illustrating a heterogeneous network structure.

Referring to FIG. 4, it is assumed that the UE 401 is in the state of monitoring the signal of the macro cell 403, i.e. camped on the macro cell 403, before step 411. Also, it is assumed that one or more pico cells 405 are deployed within the macro cell 403 in the similar way to FIG. 1. That is, the picocell 405 is installed instead of the CSG cell 303 of FIG. 1.

The UE 401 receives the system information broadcast by the macro cell 403 at step 411. In the LTE system, the system information is broadcast through Master Information Block (MIB) and System Information Block (SIB), and SIB is classified into one of SIB1, SIB2, and SIB3 depending on the contained information. Among them, the cell reselection-related parameter is included in the SIB3, and the information on the neighbor cells of the same frequency band is included in the SIB4. The UE 401 receives the cell reselection parameters of the same frequency band through SIB3 and SIB4. The macro cell 403 transmits S-intrasearch information capable of determining whether to perform cell reselection according to the signal strength and quality in the SIB3 and the offset/bias values to be applied to the respective pico cells for rang expansion in the SIB4.

The range expansion aims to avoid failing selection of a pico cell 405 due to the interference from the macro cell 403 in the situation where the macro and pico cells 403 and 405 coexist. If the macro cell 403 sends the UE the offset/bias information to be applied for the neighbor pico cells 405 in the UE's cell reselection procedure, the UE 401 selects the corresponding pico cell 405, as far as possible, using the offset/bias value although the received signal quality of the corresponding pico cell 405 is low.

That is, the UE 401 operates as follows according to the S-intrasearch field value and offset/bias value information received through the SIB3 and SIB4. The UE 401 applies the offset/bias value, i.e. used the value obtained by adding the offset/bias value to the channel measurement value of the corresponding cell in prioritizing the cells, to determine for cell reselection. If the S-intrasearch field is omitted doe to the absence of S-intrasearch field value, the UE 401 performs measurement to the corresponding cell regardless of the channel quality of the serving cell (i.e. always) to perform the cell reselection. In another method, the eNB may provide the individual cells with respective S-intrasearch values. If S-intrasearch value y is given to a certain cell x and if the channel quality of the cell x becomes lower than y, the UE 401 starts measurement for the cell x and, if the channel quality of the cell x (by taking notice of the offset) is better than that of the serving cell, reselects the cell x.

At step 413, the UE 401 performs cell reselection procedure using the information of step 411. The UE 401 performs neighbor cell measurement and, if there is any cell better than the serving cell in channel quality, receives the system information from the corresponding cell to determine whether it can reselect the cell. If the cell is in the barred state or a non-member CSG cell to which the UE has no access right, the UE 401 cannot reselect the cell. Here, the non-member CSG cell denotes the cell to which the UE 401 has not subscribed.

The UE 401 operates as follows in selecting a pico cell. For explanation convenience, a description is made with a pico cell as an example of the cell for which a negative offset value (i.e. the measurement value of the corresponding cell is biased as much as the offset) is designated. However, the same method may be applied to the other cell having a negative offset value than the pico cell. Although the channel quality of the pico cell 405 to which the offset is applied is higher than that of the serving cell, if the channel quality without application of the offset is lower than a predetermined threshold, the UE 401 does not select the pico cell 405. That is, the UE 401 selects the pico cell 405, only when both the following two conditions are fulfilled.

$R_n > R_s$; here, $R_s = Q_{meas,s} + Q_{Hyst}$, $R_n = Q_{meas,n} - Q_{offset}$  Condition 1

$R_n >$ Threshold $- Q_{offset}$  Condition 2

Here, $R_n$ denotes the measurement result to the neighbor cell for which the offset is applied, i.e. the measurement result to the pico cell for which the offset is applied. $R_n$ is obtained by adding a hysteresis value ($Q_{Hyst}$) to the measurement value of the serving cell ($Q_{meas,s}$). The threshold indicates the minimum channel quality allowing the UE 401 to operate normally, and the S-criteria calculated using the information received through the SIB3 may be used as the threshold value. The S-criteria may be calculated using the following formula.

$S_{rxlev} > 0$ AND $S_{qual} > 0$

Here, $S_{rxlev}$ and $S_{qual}$ may be calculated as follows.

$S_{rxlev} = Q_{rxlevmeas} - (Q_{rxlevmin} Q_{rxlevminoffset}) - P_{compensation}$ $S_{qual} = Q_{qualmeas} - (Q_{qualmin} Q_{qualminoffset})$ $Q_{rxlevmeas}$ denotes the measured received signal strength, and $Q_{qualmeas}$ denotes the measured received signal quality. $Q_{rxlevmin}$ denotes the minimum power value required for operation, and $Q_{qualmin}$ denotes minimum quality required for operation. $Q_{rxlevminoffset}$ denotes the offset of the power for the eNBs having priority, $Q_{qualminoffset}$ denotes the offset of the quality for the eNBs having priority, and $P_{compensation}$ denotes a compensation parameter matching the uplink transmit power of the UE.

As described above, only when the channel quality of the pico cell 405 fulfills the S-criteria of the pico cell 405, the UE 401 reselects the pico cell 405. At this time, the values received through the SIB3 of the current cell are used as $Q_{rxlevmin}$ and $Q_{qualmin}$ of the pico cell 405.

According to an embodiment of the present invention, although the channel quality to which the offset has added is higher than the channel quality of the serving cell (although the condition 1 is fulfilled), if it is failed to acquire the essential system information (e.g. MIB/SIB,1/SIB2) of the pico cell 405, the UE 301 may adjust the offset by itself. That is, after the channel condition of the corresponding cell 405 is recovered to the extent capable of acquiring the essential system information, the UE 401 may adjust the offset to reselect the cell 405. The offset adjustment may be performed according to a predetermined rule. For example, the UE 401 may increase the offset value as much as a predetermined value. Or, the UE 401 may decrease the bias level as much as a predetermined value. Or, the UE 401 may adjust the offset to 0. If the essential system information of the cell 405 is received normally after adjusting the offset, the adjusted offset may be applied continuously. For example, if the macro cell a instruct the UE to apply offset of −x for the pico cell b but the essential system information is received successfully after self-adjustment of the offset to −x+k, the UE 401 may use the adjusted offset, i.e. −x+k, in the cell reselection process to the pico cell in the macro cell a afterward. If a cell other than the cell b for which the adjusted offset is applied is reselected, the UE 401 may recover the original offset value for the corresponding cell.

If the new cell 405 is selected, the UE 401 receives the system information and paging information from the selected cell 405 at step 415.

If the raw channel quality (i.e. the channel quality without application of the offset) of the newly selected cell 405 is lower than the raw channel quality of the serving cell 403 and if the selected cell 405 and the old serving cell 403 are synchronized in System Frame Number (SFN), the UE 401 attempts receiving the paging message from both the old and new serving cells 403 and 405. If the raw channel quality (without application of the offset) of the newly selected cell 405 becomes higher than the raw channel quality of the old serving cell 403, the UE 401 stops receiving the paging message from the old cell 403 and attempts receiving the paging message from the new serving cell 405.

According to another embodiment, the following operation is possible. In the case of applying the cell range expansion to the UE 401 in idle mode, it is advantageous to reduce the battery power consumption in RRC connection establishment for the UE to transition to the connected mode. This is because the uplink transmission power consumption of the UE close to the pico cell 405 is very low. However, the application of the cell range expansion to the UE 401 in idle mode has a shortcoming in that the paging message reception failure probability of the UE 401 increases due to the interference from the macro cell 403.

According to another embodiment of the present invention, the UE 401 operating without application of the range expansion in the normal situation applies the range expansion at an instance when the RRC connection establishment is required in order to mitigate the problem. The UE 401 in the idle mode receives the paging message from the macro eNB 403 from which the received signal is strong and, if transitioning to the connected mode, selects the pico cell 405 using offset for cell reselection to perform the RRC connection establishment with the pico cell 405.

In this embodiment, if the downlink channel quality of the pico cell 405 is equal to or greater than a predetermined threshold value, the UE acquires the MIB, SIB1, and SIB2 of the pico cell 405. In the state that the channel quality of the pico cell from which the MIB/SIB1/SIB2 has been received is equal to or greater than the threshold, the pico cell 405 is managed as a potential serving cell 405. Here, the threshold may be an absolute threshold or a relative threshold indicating the different with the serving cell. The threshold value may be notified through the system information of the macro cell. However, the UE 401 is in the state of receiving the paging message from the macro cell 405 yet. Afterward, if it is required to perform RRC connection establishment, e.g. if the UE 401 receives the paging message or if transmission data occurs at the UE 401, the UE 401 selects the potential serving cell 405 to perform RRC connection establishment procedure with the serving cell 405.

Figure 5:
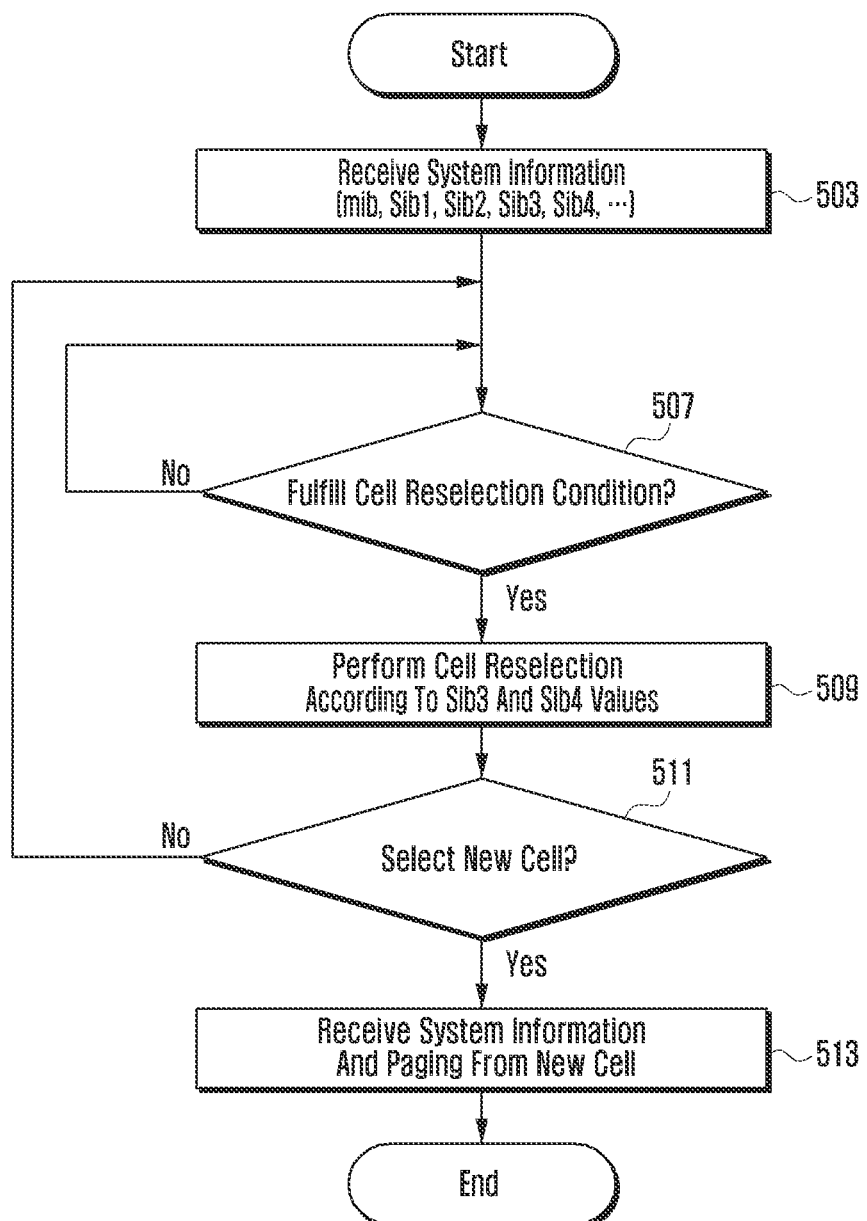
FIG. 5 is a flowchart illustrating the cell reselection procedure of the UE 401 according to the embodiment of FIG. 4.

FIG. 5 is a flowchart illustrating the cell reselection procedure of the UE 401 according to the embodiment of FIG. 4. The UE 401 receives system information from the macro cell 403 at step 503. The system information includes the information of MIB, SIB1, SIB2, SIB3, SIB4, etc.

Afterward, the UE 401 performs cell reselection corresponding to step 413 of FIG. 4. That is, the UE performs measurement on the neighbor cell 405 and, if there is any cell superior to the serving cell 403 in channel condition, receives the system information from the corresponding cell 405 to determine whether to select the cell 405. If the cell 405 is in the barred (access-barred) state or a non-member CSG cell to which the UE 401 has no access right, the UE cannot select the cell 405.

The UE 401 determines whether the cell reselection condition is fulfilled at step 507. If the cell reselection condition is not fulfilled, the UE waits until the cell reselection condition is fulfilled. If the cell reselection condition is fulfilled, the procedure goes to step 509.

The UE 401 performs cell reselection according to SIB3 and SIB values at step 509.

The UE 401 operates as follows in pico cell reselection. For explanation convenience, the description is directed to the case where the pico cell 403 as the cell for which the negative offset value (i.e. the measurement result of the corresponding cell is biased as much as the offset). Although the channel quality of the pico cell 405 to which the offset is applied is superior to the channel quality of the serving cell 403, if the channel quality with application of the offset is equal to or less than a predetermined threshold, the UE 401 does not select the pico cell 405. That is, the pico cell is selected only when the following two conditions are fulfilled.

$R_n > R_s$; here, $R_s = Q_{meas,s} + Q_{Hyst}$, $R_n = Q_{meas,n} - Q_{offset}$   Condition 1

$R_n >$ Threshold value $- Q_{offset}$   Condition 2

Here, $R_n$ denotes the measurement result to the neighbor cell for which the offset is applied, i.e. the measurement result to the pico cell for which the offset is applied. $R_n$ is obtained by subtracting $Q_{offset}$ from the neighbor cell measurement value $Q_{meas,n}$. $Q_{meas,n}$ is obtained by adding the hysteresis value $Q_{Hyst}$ to the serving cell measurement value $Q_{meas,s}$. The threshold is the minimum channel quality required for the UE 401 to operate normally in the corresponding cell, and S-criteria calculated using the information received through SIB3 may be used as the threshold value.

After the cell reselection has been performed according to the above method, the UE determines whether a new cell 405 has been selected at step 511. If a new cell 405 is selected, the procedure goes to step 513. If no new cell is selected, the procedure goes to step 507. The UE 401 receives the system information and paging message from the new cell 405 at step 513.

Figure 6:
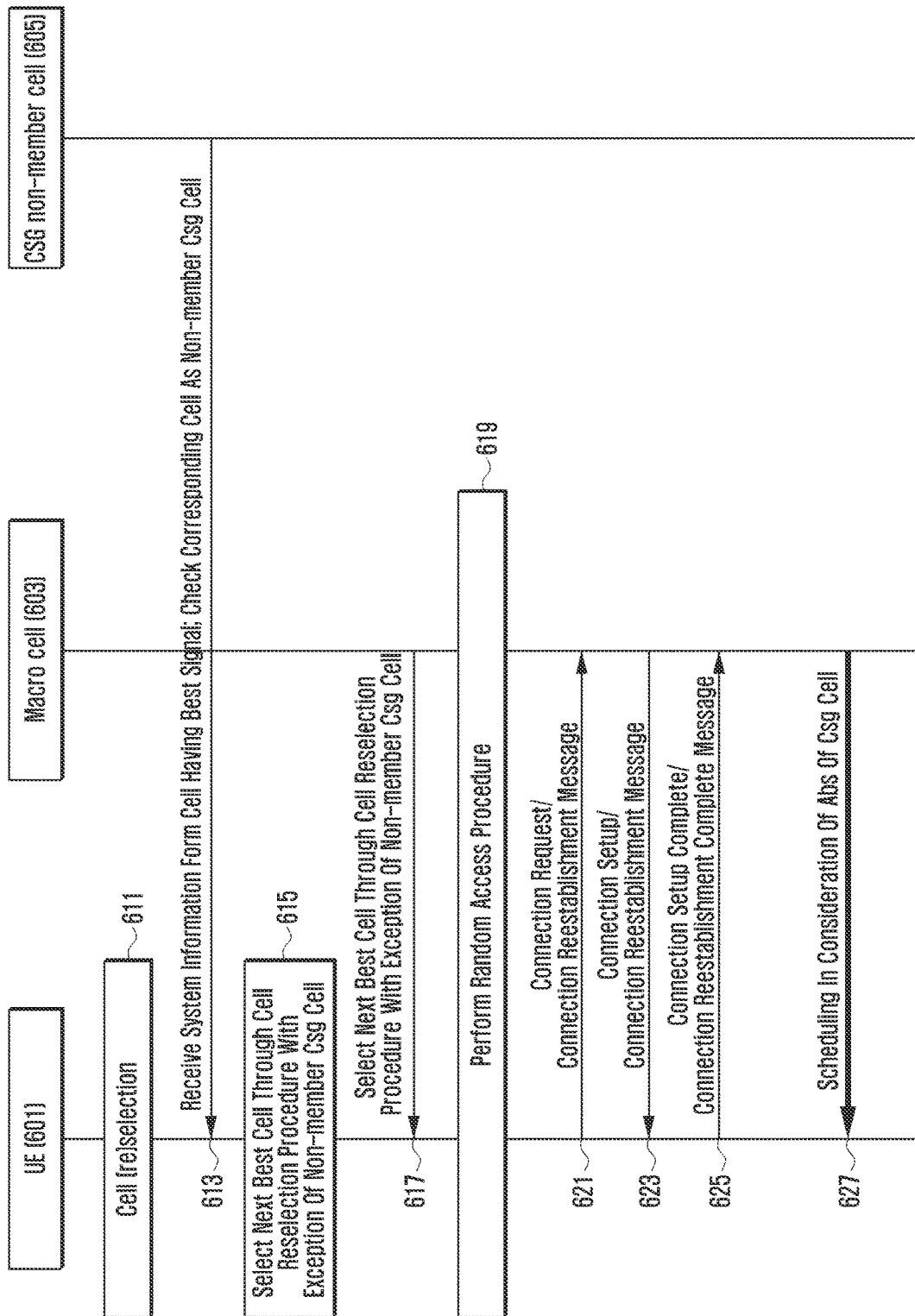
FIG. 6 is a signal flow diagram illustrating a procedure for the UE 601 to report interference from the CSG cell according to an embodiment of the present invention.

FIG. 6 is a signal flow diagram illustrating a procedure for the UE 601 to report interference from the CSG cell according to an embodiment of the present invention.

In FIG. 6, if the 601 powers on, it searches for and selects a suitable cell to start a procedure for establishing communication connection or reestablishing the lost communication connection at step 611. The UE 601 may select the cell based on the received signal condition. For example, the UE may select the cell having the best Reference Symbol Received Power (RSRP) or Reference Symbol Received Quality (RSRQ). The UE 601 also may perform cell selection based on other parameters indicating the signal condition or any combination of RSRP, RSRQ, and other parameters.

After neighbor cell search, the UE 601 receives the system information of the cell 605 having the best received signal strength and recognizes that the cell 605 is a CSG cell usable by members and the UE 601 has no access right to the CSG cell 605 at step 613. For example, if the CSG indicator (csg-Indication) value in SIB1 from the cell 605 is true and the white list of the UE 601 includes no CSG identifier (csg-Identity) of the corresponding cell 605, the UE has no access right.

Afterward, the UE 601 searches for other cells with the exception of the CSG cell 650 in the cell selection or reselection procedure to select the cell having the next highest signal strength at step 615. In the cell search process, the UE 601 continues receipt of the system information of the CSG cell 605 to acquire the Almost Blank Subframe (ABS) information of the CSG cell 650. The ABS pattern is provided in the form of a bitmap to indicate whether the interferer cell 605 transmits signal at each subframe, i.e. the subframe includes interference signal and, in the present embodiment, it is assumed that the ABS pattern is broadcast through a predetermined SIB within the cell 605. The ABS may be provided through a measSubframePatternPCell Information Element. The ABS pattern indicates the subframes at which the CSG cell does perform downlink transmission almost. If almost there is no downlink transmission, this means that the control channel such as CRS is transmitted at the normal transmit power level but PDCCH and PDSCH at a very low transmit power level.

At step 617, the UE 601 selects a cell 605 having the next best signal strength/quality (second best cell) with the exception of the CSG cell 650. In the procedure, the UE 601 may measure the channel quality of other cells by applying the ABS pattern. After selecting the second best cell 603, the UE 601 receives the system information from the next best cell 603 to determine whether the corresponding cell 603 is non-CSG cell or CSG cell to which the UE 601 has the access right.

If the corresponding cell 603 is non-CSG cell or CSG cell to which the UE 601 has the access right, the UE 601 starts RRC CONNECTION SETUP procedure or RRC CONNECTION RE-ESTABLISHMENT procedure.

The UE 601 performs random access procedure to transmit a message at step 619. The random access procedure is performed in such a way that the UE 601 transmits a certain preamble at a position of the random access channel and is allocated resource from the eNB 603. If uplink resource is allocated through random access procedure, the UE 601 sends the cell 603 an RRC CONNECTION REQUEST message or an RRC CONNECTION REESTABLISHMENT REQUEST message for connection request or connection reconfiguration at step 621. In the embodiment, the RRC CONNECTION REQUEST message or RRC CONNECTION REESTABLISHMENT REQUEST message may include an indicator indicating that the UE 601 is interfered significantly by the non-member CSG cell 605, i.e. the CSG cell to which the UE 601 is not allowed for access. The RRC CONNECTION REQUEST message or RRC CONNECTION REESTABLISHMENT REQUEST message also may include an indicator indicating that the channel quality of the non-member CSG cell 605 is better than the channel quality of the cell 603.

If the network of the cell 603 allows access, the UE 601 receives a connection setup or connection reestablishment message from the network through the cell 603 at step 623. This message may be any of RRC Connection Setup or RRC Connection Reestablishment message.

Accordingly, the UE 601 transmits a confirmation message to the network at step 625. The confirmation message transmitted by the UE 601 may be the RRC Connection Setup Complete or RRC Connection Reestablishment Complete message. According to an embodiment, the confirmation message of step 625 may include an indicator indicating that the best cell having the strongest received signal to the UE 601 is a non-CSG cell. If the indicator indicating that the best cell having the strongest received signal to the UE 601 is received, the cell 603 performs scheduling in consideration of ABS by taking of that. The confirmation message of step 625 may further include the following informations.

cell identifier (cell id) and RSRP/RSRQ measurement value of non-member CSG cell 605

ABS pattern of non-member CSG cell 605

UE 601 acquire above information from predetermined SIB of non-member CSG cell 605

If UE has started RRC CONNECTION SETUP/RRC CONNECTION REESTABLISHMENT procedure before acquiring above information, the corresponding information may not be received.

RSRP/RSRQ measurement value of the serving cell, i.e. the cell 603 performing RRC CONNECTION SETUP procedure or RRC CONECTION RE-ESTABLISHMENT procedure currently SFN difference between non-member CSG cell 605 and serving cell 603

After completing the RRC CONNECTION SETUP procedure or RRC CONECTION RE-ESTABLISHMENT procedure with the UE 601, the eNB 603 performs resource allocation (scheduling) to the UE 601 at the ABS subframe having no interference of the CSG cell 605 at step 627 in order to prevent the corresponding UE 601 from experiencing interference problem.

Figure 7:
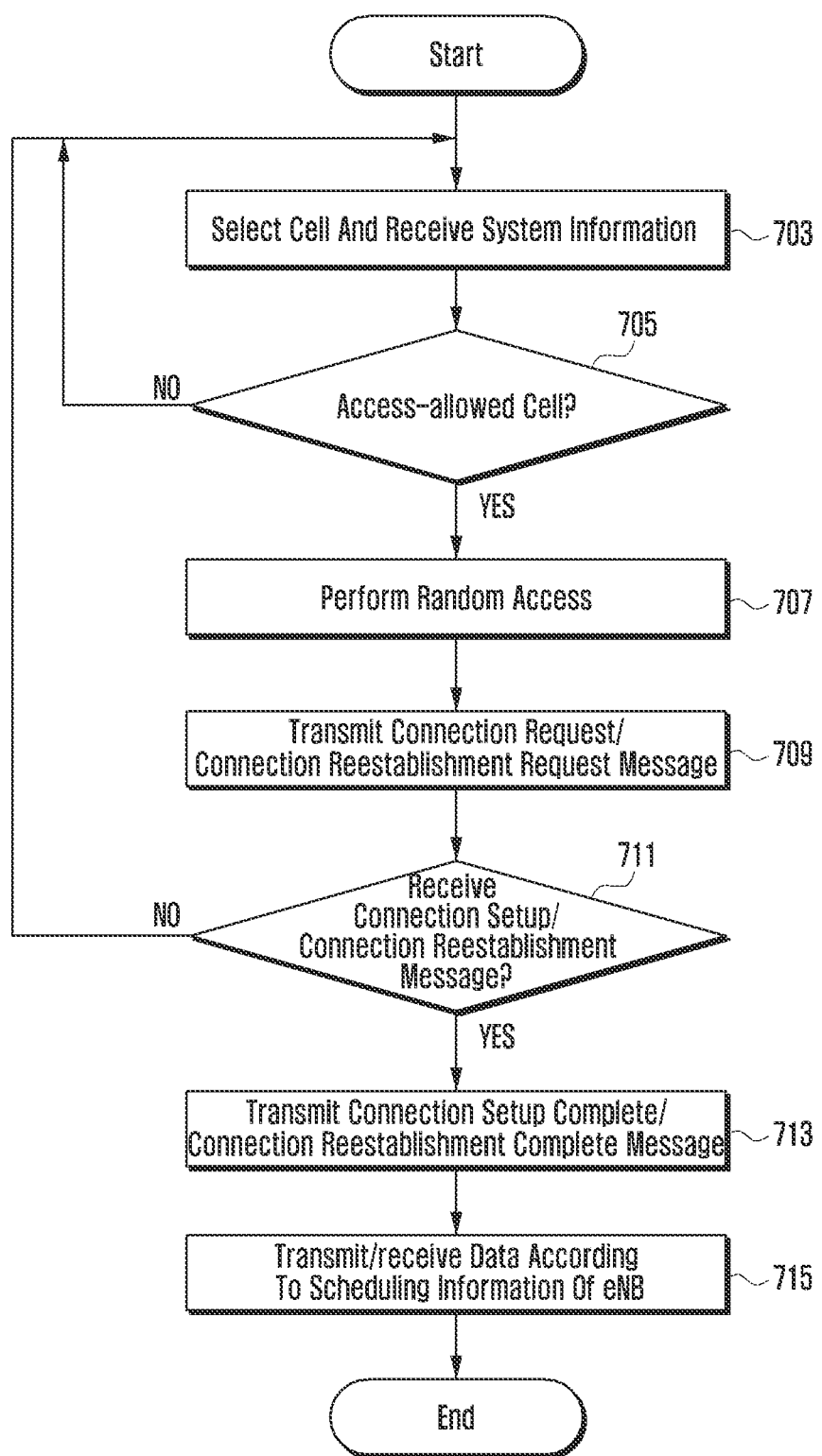
FIG. 7 is a flowchart illustrating the interference report procedure of the UE according to the embodiment of FIG. 6.

FIG. 7 is a flowchart illustrating the interference report procedure of the UE according to the embodiment of FIG. 6.

Referring to FIG. 7, the UE 601 selects the cell 605 having the best received signal strength/quality among the neighbor cells in the cell (re)selection procedure and receives system information of the corresponding cell 605 at step 703. The UE 601 checks the content of the system information received at step 703 and determines whether the selected cell 605 is an access-allowed cell at step 705. As described with reference to FIG. 6, the UE may determine whether the cell is the access-allowed cell using the information on the CSG indicator (csg-Indication) value in SIB1 from the cell 605 is true and whether the white list of the UE 601 includes no CSG identifier (csg-Identity) of the corresponding cell 605. If the selected cell is not the access-allowed cell, the UE 601 performs the cell reselection procedure for selecting the next best cell at step 703. If the selected cell 603 is the access-allowed cell, the UE 601 performs the random access procedure to the corresponding cell at step 707.

If any uplink resource is allocated through the random access procedure, the UE 601 transmits the RRC CONNECTION REQUEST message or the RRC CONNECTION REESTABLISHMENT REQUEST message for connection request or connection reestablishment at step 709. In this embodiment, the RRC CONNECTION REQUEST message or the RRC CONNECTION REESTABLISHMENT REQUEST message may include an indicator indicating that the UE is interfered significantly by the non-member CSG cell 605 or the channel quality of the non-member CSG cell 605 is better than the channel quality of the current cell 603.

Afterward, the UE 601 determines whether a connection message (connection setup/connection reestablishment message) is received from the eNB 603 at step 711. If the connection message is not received in a predetermined time, the procedure returns to step 703 such that the UE 601 performs the cell reselection procedure again. If the connection message is received from the network, the UE 601 sends a confirmation message to the cell of the network at step 713. The confirmation message transmitted by the UE 601 may be any of the RRC Connection Setup Complete and RRC Connection Reestablishment Complete messages. The confirmation message transmitted by the UE 601 may include an indicator indicating that the best cell corresponding to the strongest received signal strength is non-member CSG cell. The confirmation message may further include following informations.

cell id of non-member CSG cell 605 and RSRP/RSRQ measurement value

ABS pattern of non-member CSG cell 605

UE 601 acquire predetermined SIB of non-member CSG cell 605 from above information.

If UE 601 has started RRC CONNECTION SETUP/RRC CONNECTION REESTABLISHMENT procedure before acquiring above information, the corresponding information may not be received.

RSRP/RSRQ measurement value of the serving cell, i.e. the cell 603 performing RRC CONNECTION SETUP procedure or RRC CONECTION RE-ESTABLISHMENT procedure currently SFN difference between non-member CSG cell 605 and serving cell 603

Afterward, the UE 601 transmits and receives data according to the scheduling information of the eNB 603 at step 715. At this time, the scheduling information may be the scheduling information allocated by the cell 603 in order to prevent the corresponding UE 601 from being interfered according to the ABS pattern information transmitted by the UE 601 in the above procedure.

Figure 8:
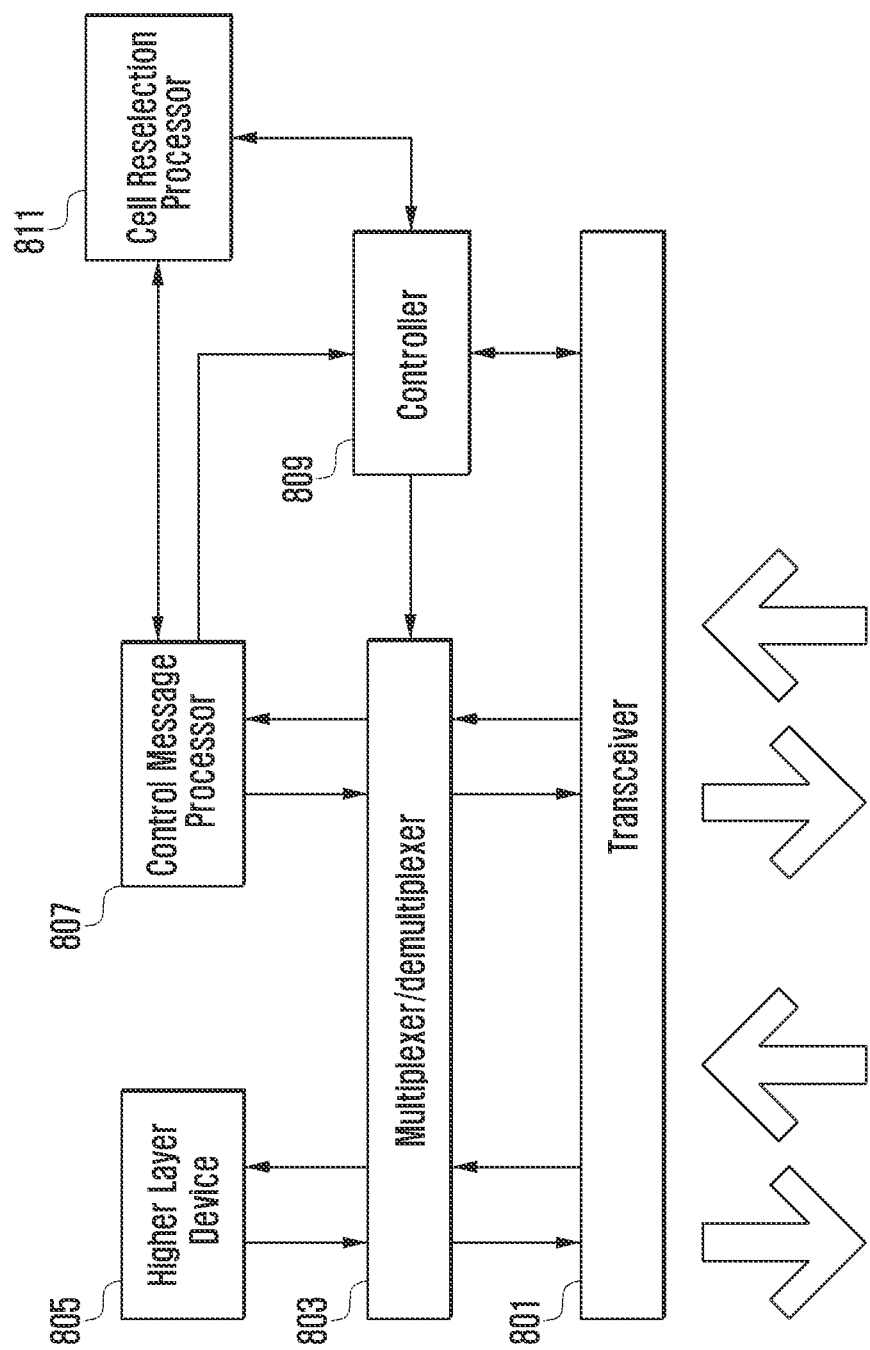
FIG. 8 is a block diagram illustrating the UE according to an embodiment of the present invention.

FIG. 8 is a block diagram illustrating the UE according to an embodiment of the present invention. The UE transmits and receives data to and from the higher layer 805. The control message processor 807 transmits and receives control messages. In transmission, the multiplexer 803 multiplexes data and the transceiver 801 transmits the multiplexed data under the control of the controller. In reception, the transceiver 801 receives a physical signal and the demultiplexer 803 demultiplexes the received signal under the control of the controller 809. The demultiplexed signal is delivered to the higher layer device 805 or the control message processor 807 according to the message information.

In this embodiment, if the SIB message is received for cell reselection, the control message processor 807 processes the corresponding information and delivers the information to the cell reselection processor 811. In searching for neighbor cell, the UE determines the parameter to be used for cell selection. If it is necessary perform cell reselection afterward, the UE checks the information on the signal strength to determine whether to further read the MIB and SIB information of the corresponding cell. If it is required to read the MIB and SIB information of the corresponding cell, the control unit 809 receives the MIB and SIBs of the new cell. Afterward, the cell reselection processor 811 determines whether it is possible to access the corresponding cell and performs additional process or reselection procedure for selecting a new cell according to the determination result.

Afterward, in the case of attempting access to the access-allowed cell, if the control unit 809 commands for uplink resource allocation, the control message processor generates and transmits the connection request or connection reestablishment request message. This message may include an indicator indicating that the UE is interfered significantly by the non-member CSG cell or the channel quality of the non-member CSG cell is better than the channel quality of the current cell. Afterward, if the connection setup/connection reestablishment message is received from the eNB, the UE sends the eNB a confirmation message. The confirmation message transmitted by the UE may include the information indicating that the best cell having highest received signal strength is the non-member CSG cell as described with reference to FIGS. 6 and 7. The confirmation method may further include following informations.

cell id of non-member CSG cell 605 and RSRP/RSRQ measurement value

ABS pattern of non-member CSG cell 605

UE 601 acquire predetermined SIB of non-member CSG cell 605 from above information.

If UE 601 has started RRC CONNECTION SETUP/ RRC CONNECTION REESTABLISHMENT procedure before acquiring above information, the corresponding information may not be received.

RSRP/RSRQ measurement value of the serving cell, i.e. the cell 603 performing RRC CONNECTION SETUP procedure or RRC CONECTION RE-ESTABLISHMENT procedure currently SFN difference between non-member CSG cell 605 and serving cell 603

Figure 9:
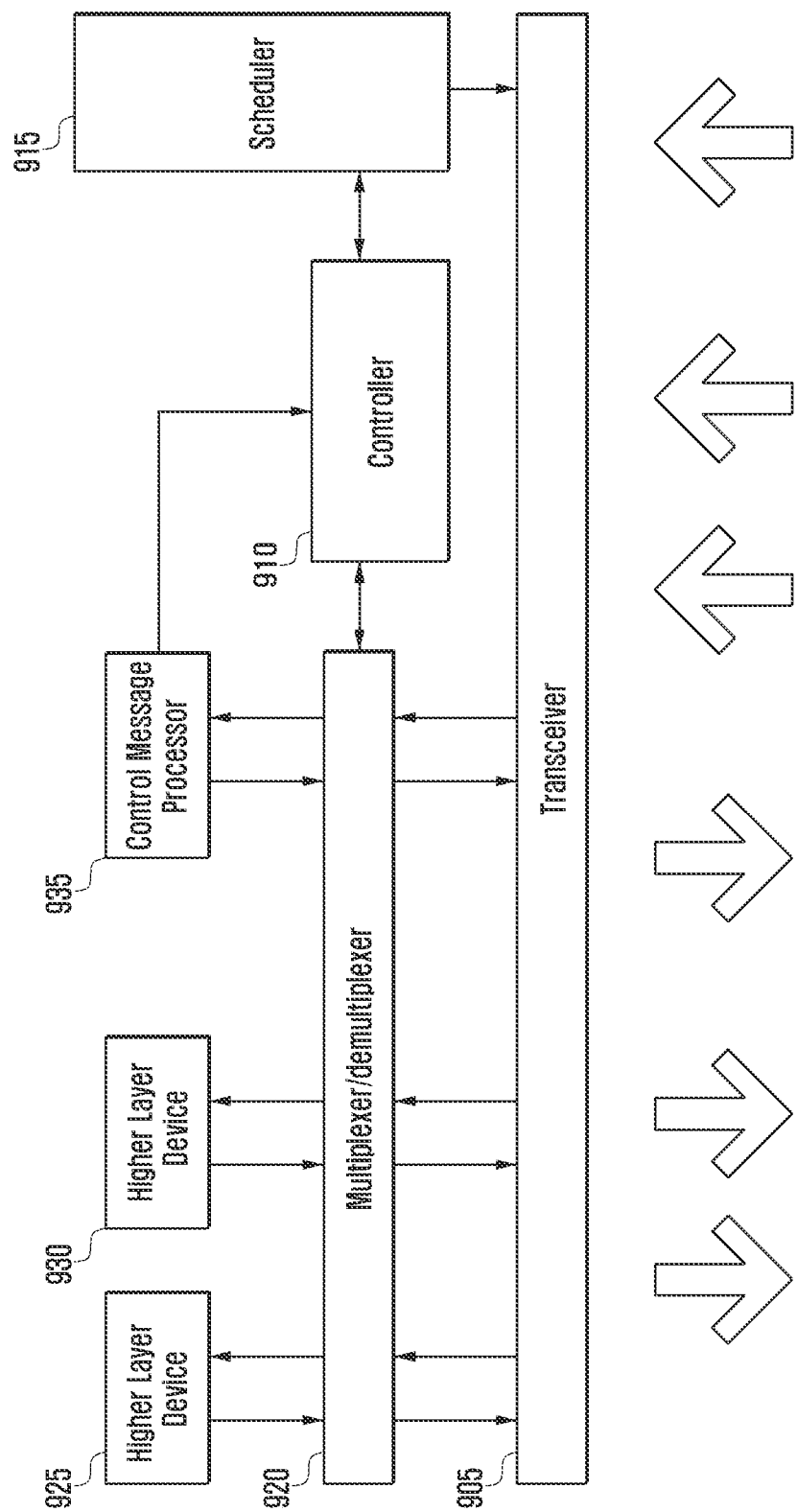
FIG. 9 is a block diagram illustrating the eNB according to an embodiment of the present invention.

FIG. 9 is a block diagram illustrating the eNB according to an embodiment of the present invention. The eNB includes a transceiver 905, a controller 910, a multiplexer/demultiplexer 920, a control message processor 935, higher layer devices 925 and 930, and a scheduler 915.

The transceiver 905 transmits data and control signals on downlink carriers and receives data and control signals on uplink carriers. In the case that a plurality of carriers is configured, the transceiver 905 may transmit and received data and control signals over a plurality of carriers. The multiplexer/demultiplexer 920 multiplexes the data generated by higher layer processors 925 and 930 and the control message processor 935 and demultiplexes the data received through the transceiver 905 and delivers the demultiplexed data to the higher layer processors 925 and 930, control message processor 935, and/or the controller 910. The control message processor 935 may takes an action necessary for processing the control message transmitted by the UE and delivers the controls message to be transmitted to the UE to the higher layer. The higher layer processors 925 and 930 may be formed per UE per service and processes the data generated in the user service such as FTP and VoIP to transfer the processed data to the multiplexer/demultiplexer 920 or processes the data output from the multiplexer/demultiplexer 920 to transfer the processed data to the service applications of the higher layer. The controller 910 determines the timing of transmitting CSI/SRS and controls the transceiver. The scheduler allocates transmission resource to the UE at an appropriate time in consideration of the buffer state, channel condition, and active time of the UE and controls the transceiver to process the signal transmitted by or to be transmitted to the UE.

In this embodiment, if the information indicating the interference caused by the non-member CSG cell is acquired from the received message in the UE's access attempt, the scheduler 915 allocates resource to the UE in the frame having low interference.

The proposed method is advantageous in performing the cell reselection procedure without malfunctioning by selecting the cell which is actually accessible even in the case of using the offset for cell reselection in the HetNet situation and in transmitting/receiving data without interference, when there is any non-member CSG cell, by notifying the cell to which the UE connects actually of the information on the interference from the corresponding cell.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A cell selection method of a terminal, the method comprising:
   identifying whether a first cell having greatest channel quality is a closed subscriber group (CSG) cell;
   identifying, if the first cell is the CSG cell, whether an identification of the first cell is included in a cell list of the terminal;
   selecting, if the identification of the first cell is not included in the cell list, a second cell having greatest channel quality after the first cell;
   accessing the second cell; and
   transmitting a radio resource control (RRC) message including an indicator indicating that a channel quality of the first cell is greater than a channel quality of the second cell, to the second cell,
   wherein the second cell is selected based on the channel quality of the second cell and an offset value obtained from first system information, and
   wherein the offset value is changed by the terminal if second system information is not received.

2. The method of claim 1, further comprising:
   receiving system information of the first cell after selecting the second cell to obtain almost blank subframe (ABS) information of the first cell.

3. The method of claim 2, wherein the ABS information is used to schedule the terminal, if the RRC message includes the indicator.

4. The method of claim 1, wherein the RRC message includes at least one of an RRC connection request message or an RRC connection reestablishment request message.

5. The method of claim 1, wherein the identifying of the first cell is the CSG cell further comprises:
   measuring channel quality of the first cell;
   measuring channel quality of at least one other cell;
   determining whether a value obtained by applying an offset to the channel quality of the first cell is greater than the channel quality of the at least one other cell;
   determining, if the value obtained by applying an offset to the channel quality of the first cell is greater than the channel quality of the at least one other cell, the channel quality of the first cell without application of the offset is greater than a predetermined threshold; and
   identifying whether the first cell is the CSG cell, if the channel quality of the first cell without application of the offset is greater than a predetermined threshold.

6. A scheduling method of a base station, the method comprising:
   receiving a radio resource control (RRC) message from a terminal;

determining whether the RRC message includes an indicator indicating that a channel quality of a first cell is greater than a channel quality of a second cell; and scheduling, if the RRC message includes the indicator, resource for the terminal in consideration of a closed subscriber group (CSG) cell, wherein the first cell is the CSG cell having greatest channel quality and to which the terminal is not subscribed, wherein the second cell having greatest channel quality after the first cell is selected to be accessed by the terminal, wherein the second cell is selected by the terminal based on the channel quality of the second cell and an offset value included in first system information, and wherein the offset value is changed by the terminal if second system information is not received by the terminal.

7. The method of claim 6, wherein the scheduling of the resource comprises:

extracting, if the RRC message includes the indicator, at least one of a cell identifier of the CSG cell or almost blank subframe (ABS) information of the CSG cell; and scheduling the resource for the terminal based on at least one of the cell identifier or the ABS information.

8. A terminal comprising:

a transceiver configured to transmit and receive a signal;

at least one processor configured to:
identify whether a first cell having greatest channel quality is a closed subscriber group(CSG) cell,
identify, if the first cell is the CSG cell, whether an identification of the first cell is included in a cell list of the terminal,
select, if the identification of the first cell is not included in the cell list, a second cell having greatest channel quality after the first cell,
access the second cell; and
transmit a radio resource control (RRC) message including an indicator indicating that a channel quality of the first cell is greater than a channel quality of the second cell, to the second cell,
wherein the second cell is selected based on the channel quality of the second cell and an offset value obtained from first system information, and
wherein the offset value is changed by the terminal if second system information is not received.

9. The terminal of claim 8, wherein the at least one processor is further configured to:

receive system information of the first cell after selecting the second cell to obtain almost blank subframe (ABS) information of the first cell.

10. The terminal of claim 9, wherein the ABS information is used to schedule the terminal, if the RRC message includes the indicator.

11. The terminal of claim 8, wherein the RRC message includes at least one of an RRC connection request message or an RRC connection reestablishment request message.

12. The terminal of claim 8, wherein the at least one processor is further configured to:
measure channel quality of the first cell;
measure channel quality of at least one other cell;
determine whether a value obtained by applying an offset to the channel quality of the first cell is greater than the channel quality of the at least one other cell;
determine, if the value obtained by applying an offset to the channel quality of the first cell is greater than the channel quality of the at least one other cell, the channel quality of the first cell without application of the offset is greater than a predetermined threshold; and
identify whether the first cell is the CSG cell, if the channel quality of the first cell without application of the offset is greater than a predetermined threshold.

13. A base station comprising:

a transceiver configured to receive a radio resource control (RRC) message from a terminal; and at least one processor configured to:
determine whether the RRC message includes an indicator indicating that a channel quality of a first cell is greater than a channel quality of a second cell, and
schedule, if the RRC message includes the indicator, resource for the terminal in consideration of a closed subscriber group (CSG) cell,
wherein the first cell is the CSG cell having greatest channel quality and to which the terminal is not subscribed,
wherein the second cell having greatest channel quality after the first cell is selected to be accessed by the terminal,
wherein the second cell is selected by the terminal based on the channel quality of the second cell and an offset value included in first system information, and
wherein the offset value is changed by the terminal if second system information is not received by the terminal.

14. The base station of claim 13, wherein the at least one processor is further configured to:

extract, if the RRC message includes the indicator, at least one of a cell identifier of the CSG cell or almost blank subframe (ABS) information of the CSG cell, and schedule the resource for the terminal based on at least one of the cell identifier or the ABS information.

* * * * *